United States Patent
Sanbayashi et al.

(10) Patent No.: US 7,060,643 B2
(45) Date of Patent: *Jun. 13, 2006

(54) PHOTO-FUNCTIONAL POWDER AND APPLICATIONS THEREOF

(75) Inventors: Masayuki Sanbayashi, Toyama (JP); Hiroyuki Hagihara, Aichi (JP); Jun Tanaka, Toyama (JP); Yoshinori Ueyoshi, Toyama (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 438 days.

This patent is subject to a terminal disclaimer.

(21) Appl. No.: 10/028,721

(22) Filed: Dec. 28, 2001

(65) Prior Publication Data

US 2002/0160910 A1 Oct. 31, 2002

Related U.S. Application Data

(60) Provisional application No. 60/270,874, filed on Feb. 26, 2001.

(30) Foreign Application Priority Data

Dec. 28, 2000 (JP) .................... P2000-402470
Dec. 21, 2001 (JP) .................... P2001-388615

(51) Int. Cl.
*B01J 27/14* (2006.01)
*C01B 15/16* (2006.01)
*C08K 3/32* (2006.01)
*B32B 15/02* (2006.01)

(52) U.S. Cl. .............. 501/162; 502/208; 502/350; 423/311; 423/312; 423/314; 524/414; 428/403

(58) Field of Classification Search .......... 502/208, 502/350; 501/162; 423/311, 312, 314; 524/414, 524/417; 428/403
See application file for complete search history.

(56) References Cited

U.S. PATENT DOCUMENTS 5,242,880 A * 9/1993 Irick, Jr. ............... 502/208
5,872,072 A * 2/1999 Mouri et al. .......... 502/208

(Continued)

FOREIGN PATENT DOCUMENTS

EP  719579 A1  7/1996
EP  0-963789 A2  12/1999

(Continued)

OTHER PUBLICATIONS

Patent Abstracts of Japan, abstracting JP 2000-302422, Oct. 31, 2000.
Patent Abstracts of Japan, abstracting JP 09-000942, Jan. 7, 1997.
Patent Abstracts of Japan, abstracting JP-10-245721, Sep. 14, 1998.
Patent Abstracts of Japan, abstracting JP-2001-276194, Oct. 9, 2001.

*Primary Examiner*—Mark L. Bell
*Assistant Examiner*—Patricia L Hailey
(74) *Attorney, Agent, or Firm*—Sughrue Mion, PLLC (57) ABSTRACT

A condensed phosphate containing an alkaline earth metal is caused to be present on the surface of titanium dioxide fine particles, and as a result, the condensed phosphate is firmly coupled with the fine particles and is barely liberated from the surface of the fine particles into a medium such as a binder or a resin. As a result, photo-functional particles exhibiting durability and dispersion stability are obtained. By use of the photo-functional particles, a powder and a slurry exhibiting excellent photo-functional property, durability, dispersion stability, and hydrophilicity are produced. In addition, by use of the powder and slurry, a polymer composition, a coating agent, a photo-functional formed article, and a photo-functional structure are produced.

27 Claims, 1 Drawing Sheet

U.S. PATENT DOCUMENTS

| | | | | |
|---|---|---|---|---|
| 5,981,425 A | * | 11/1999 | Taoda et al. | 502/208 |
| 6,090,736 A | * | 7/2000 | Taoda et al. | 502/5 |
| 6,180,548 B1 | * | 1/2001 | Taoda et al. | 501/137 |
| 6,291,067 B1 | * | 9/2001 | Taoda et al. | 428/375 |
| 6,383,980 B1 | * | 5/2002 | Hagihara et al. | 502/340 |
| 6,407,156 B1 | * | 6/2002 | Hagihara et al. | 524/494 |
| 2001/0046944 A1 | * | 11/2001 | Ito et al. | 502/350 |
| 2002/0187338 A1 | * | 12/2002 | Tanaka et al. | 428/336 |

FOREIGN PATENT DOCUMENTS

| | | |
|---|---|---|
| EP | 1-052027 A1 | 11/2000 |
| EP | 1-064999 A1 | 1/2001 |
| EP | 1-118385 A1 | 7/2001 |
| EP | 1-147812 A1 | 10/2001 |
| EP | 1-153999 A1 | 11/2001 |
| JP | 9-942 A | 1/1997 |
| JP | 10-244166 A | 9/1998 |
| JP | 10-245721 A | 9/1998 |
| JP | 2000-302422 A | 10/2000 |
| JP | 2001-276194 A | 10/2001 |
| WO | WO 99/33566 A1 | 7/1999 |
| WO | WO 00/06300 A1 | 2/2000 |
| WO | WO 00/34146 A1 | 6/2000 |

* cited by examiner

Fig. 1

PHOTO-FUNCTIONAL POWDER AND APPLICATIONS THEREOF

CROSS REFERENCE TO RELATED APPLICATION

The present application is filed under 35 U.S.C. §111(a), and claims benefit, pursuant to 35 U.S.C. §119(e)(1), of the filing date of Provisional Application No. 60/270,874 filed Feb. 26, 2001 pursuant to 35 U.S.C. §111(b).

TECHNICAL FIELD

The present invention relates to a material having photo-catalytic functions, photo-functional properties such as ultraviolet absorbing ability and transparency, and hydrophilicity. More particularly, the present invention relates to a photo-functional powder; a slurry thereof; and a material containing the powder or slurry, such as a polymer composition, a coating agent, a photo-functional formed article, a photo-functional structure, or a hydrophilic structure. Furthermore, the present invention relates to application of a material containing the photo-functional powder to the surface of fiber, paper, or plastic; kneading of the photo-functional powder into fiber or plastic; and use of the photo-functional powder in the form of coating material.

BACKGROUND ART

Heretofore, titanium dioxide has been widely used as a white pigment, because of its excellent hiding power and superior tinting strength. When titanium dioxide is processed into ultrafine particles having a fine particle size, it is known to exhibit new optical properties different from those of conventional titanium dioxide pigments. On the basis of this knowledge, in recent years, extensive studies have been carried out on titanium dioxide fine particles. Regarding such optical properties, for example, when titanium dioxide is formed into fine particles having a diameter approximately half the wavelength of visible light, the scattering effect of the titanium dioxide fine particles is reduced considerably, and as a result, the fine particles transmit visible light while exerting excellent ultraviolet absorbing effect. Therefore, titanium dioxide fine particles have become of interest as an ultraviolet absorber capable of transmitting visible light.

Meanwhile, when titanium dioxide particles are formed into fine particles, they increase in the surface area, and the effect of the surface of the particles surpasses the effect of the bulk of the particles. As a result, the photocatalytic effect of the titanium dioxide particles comes to stand out. The photocatalytic mechanism of titanium dioxide is considered to proceed on the basis of the following mechanism. First, when titanium dioxide fine particles are irradiated with light, electrons and holes generated inside the fine particles react with water and oxygen near the surface of the fine particles, to thereby produce hydroxyl radicals and hydrogen peroxide. By the strong oxidation-reduction action of the hydroxyl radicals and hydrogen peroxide, harmful organic substances are purified into carbon dioxide gas and water. Such a photocatalytic action of titanium dioxide fine particles is said to continue semi-permanently insofar as titanium dioxide fine particles, light, water, and oxygen are present. Studies have been carried out on environmental purification utilizing such photo-functional properties of titanium dioxide ultrafine particles, such as antibiosis, deodorization, antifouling, air cleaning, and water cleaning.

Attempts to utilize such a photo-functional activity of titanium dioxide fine particles have led to proposing a method of kneading titanium dioxide fine particles into an easily handled medium such as a fibrous material or a plastic formed article, and a method of applying the fine particles to the surface of a substrate such as cloth or paper. In addition, a method of applying the fine particles to the surface of an object so as to cause the surface to exhibit excellent hydrophilicity has been proposed. However, not only harmful organic substances or environmental contaminants, but also media such as fiber, plastic, and paper are easily decomposed and impaired by the strong photocatalytic activity of titanium dioxide, and, in view of durability, this stands as an obstacle to practical use. Also, because titanium dioxide fine particles are easily handled, a coating material prepared by mixing titanium dioxide fine particles and a binder has been developed. However, a binder exhibiting the durability sufficiently high to overcome the problem (obstacle) of activity on the media has not yet been found. Furthermore, in order to impart to the coating material excellent hydrophilicity—attributed to the photo-functional property of titanium dioxide—the coating material must contain silica particles, silicone molecules, etc. in addition to titanium dioxide fine particles, and the coating material must be subjected to photo-excitation.

With regard to the related technology, JP-A-9-225319 (the term "JP-A" as used herein means "unexamined published Japanese Patent Application") and JP-A-9-239277 disclose a technique of preventing and suppressing the deterioration of a resin medium or a binder that would otherwise occur because of the strong photocatalytic activity of titanium dioxide particles, where there is proposed, as means therefor, a method of bearing a photoinactive compound such as aluminum, silicon, or zirconium on the surface of titanium dioxide particles such that the compound assumes a form of archipelago with steric hindrance to thereby suppress the photocatalytic activity. However, this method is disadvantageous in that, since the photoinactive compound is supported so as to form an archipelago form, a portion subjected to the strong photocatalytic activity of titanium dioxide is present at a specific site of the resin medium or binder.

JP-A-10-244166 (U.S. Pat. No. 6,180,548) proposes photocatalytic titanium dioxide prepared by coating the surface of titanium dioxide with porous calcium phosphate. However, in this case, as has been pointed out, the photocatalytic performance decreases because of the coating film; that is, the calcium phosphate layer.

International Patent Publication WO99/33566 discloses a titanium dioxide fine particle powder where a porous calcium phosphate coating layer is formed at least on a portion of the surface of titanium dioxide fine particles, and an anionic surfactant is present in the interface between the layer and the surface of the fine particles.

With respect to a slurry containing titanium dioxide having photocatalytic activity, JP-A-11-335121 discloses an anatase-type-titanium-oxide-containing slurry obtained by subjecting a titania sol solution, a titania gel, or a titania sol·gel mixture to heat treatment and pressure treatment in a closed container, and then to dispersion using ultrasonic waves or stirring.

JP-A-11-343426 discloses a photocatalytic coating material having excellent dispersion stability, which is a photocatalytic coating material containing titanium oxide and silica sol in a solvent, where the titanium oxide has a Raman spectrum peak in the range from 146 to 150 cm$^{-1}$, and 95 mass % or more of the titanium oxide is occupied by anatase-type titanium dioxide.

Japanese Patent No. 2756474 discloses a substrate including a photocatalytic film formed from a photocatalytic semiconductor material and silica or silicone, wherein the surface of the film exhibits hydrophilicity through photo-excitation; and a composition used for forming the substrate.

As described above, although several techniques have been disclosed, there cannot be provided, in a industrially useful manner, a photo-functional material (powder, slurry, etc.) exhibiting photocatalytic activity and hydrophilicity which satisfies both durability and dispersion stability when used in combination with an organic material.

DISCLOSURE OF THE INVENTION

In view of the foregoing, an object of the present invention is to provide photo-functional particles which exhibit excellent dispersion stability without impairing the photo-functional property of titanium dioxide, and which have excellent industrial applicability; a powder and a slurry containing the particles; and applications thereof.

Particularly, an object of the present invention is to provide photo-functional particles which exhibit excellent photo-functional property, durability, dispersion stability, and hydrophilicity when applied to the surface of a material such as fiber, paper, or plastic, when kneaded into such a material, and when used in a coating material composition; a powder and a slurry containing the particles; and a polymer composition, a coating agent, a photo-functional formed article, a photo-functional structure, etc. making use of the particles.

As a result of extensive investigations aimed at attaining the above-described object, the present inventors have found that, surprisingly, when a condensed phosphate containing an alkaline earth metal (hereinafter simply referred to as a "condensed phosphate") is caused to be present on the surface of titanium dioxide fine particles, the condensed phosphate, which is soluble, is firmly coupled with or supported on the titanium dioxide fine particles, preventing release from the surface of the fine particles in a medium such as a binder or a resin, and as a result, the problems described above can be solved. The present invention has been accomplished on the basis of this finding.

The mechanism by which a condensed phosphate containing an alkaline earth metal (condensed phosphate) is coupled with or supported on the surface of titanium dioxide fine particles has not yet been elucidated. However, the mechanism is considered to be as follows. When titanium dioxide fine particles, condensed phosphate ions, and alkaline earth metal ions are present in combination, the alkaline earth metal ions serve as a binder between the condensed phosphate ions and the titanium dioxide fine particles, and thus the condensed phosphate is firmly coupled with or supported on the fine particles.

The present invention provides photo-functional particles; a photo-functional powder containing the particles; an aqueous slurry containing the particles; and applications of the photo-functional powder or aqueous slurry, such as a coating agent, a photo-functional organic polymer composition, a coating material containing the polymer composition, a compound, a masterbatch for various formed articles, a photo-functional formed article, a photo-functional structure, and a hydrophilic structure, which are described below.

(1) Photo-functional particles characterized by comprising titanium dioxide and a condensed phosphate containing an alkaline earth metal which is present on the surface of the titanium dioxide.

(2) Photo-functional particles according to (1), wherein the titanium dioxide has a particle size falling within a range of about 0.001 to about 0.1 μm.

(3) Photo-functional particles according to (1) or (2), wherein the titanium dioxide contains at least one crystal form selected from the group consisting of anatase, rutile, and brookite.

(4) Photo-functional particles according to any one of (1) through (3), wherein the condensed phosphate is at least one species selected from the group consisting of a polyphosphate, a metaphosphate, and an ultraphosphate.

(5) Photo-functional particles according to any one of (1) through (3), wherein the condensed phosphate is a pyrophosphate.

(6) Photo-functional particles according to any one of (1) through (5), wherein the alkaline earth metal is at least one species selected from among Mg and Ca.

(7) A photo-functional powder comprising photo-functional particles, the particles comprising titanium dioxide and a condensed phosphate containing an alkaline earth metal which is present on the surface of the titanium dioxide.

(8) A photo-functional powder according to (7), wherein the titanium dioxide has a primary particle size falling within a range of about 0.001 to about 0.1 μm.

(9) A photo-functional powder according to (7) or (8), wherein the titanium dioxide contains at least one crystal form selected from the group consisting of anatase, rutile, and brookite.

(10) A photo-functional powder according to any one of (7) through (9), wherein the condensed phosphate is at least one species selected from among a polyphosphate, a metaphosphate, and an ultraphosphate.

(11) A photo-functional powder according to any one of (7) through (9), wherein the condensed phosphate is a pyrophosphate (12) A photo-functional powder according to any one of (7) through (11), wherein the alkaline earth metal is at least one species selected from among Mg and Ca.

(13) An aqueous slurry comprising photo-functional particles as recited in any one of (1) through (6).

(14) An aqueous slurry according to (13), which has a pH of about 5 to about 9.

(15) An aqueous slurry according to (13) or (14), wherein, when the slurry contains the photo-functional particles in an amount of 10 mass %, the slurry has a transmittance of at least about 20% at a wavelength of 550 nm and an optical length of 2 mm.

(16) A coating agent comprising an aqueous slurry as recited in any one of (13) through (15).

(17) An organic polymer composition comprising a photo-functional powder as recited in any one of (7) through (12).

(18) An organic polymer composition according to (17), which contains the photo-functional powder in an amount of about 0.01 to about 80 mass % on the basis of the entire mass of the composition.

(19) An organic polymer composition according to (17) or (18), wherein the organic polymer of the composition is at least one species selected from the group consisting of a synthetic thermoplastic resin, a synthetic thermosetting resin, and a natural resin.

(20) A coating material comprising an organic polymer composition as recited in any one of (17) through (19).

(21) A compound comprising an organic polymer composition as recited in any one of (17) through (19).

(22) A masterbatch for a formed article selected from among fiber, film, and plastic formed articles, comprising an organic polymer composition as recited in (17) or (19) containing a large amount of the photo-functional powder.

(23) A photo-functional formed article which is formed from an organic polymer composition as recited in any one of (17) through (19) containing the photo-functional powder.

(24) A photo-functional formed article according to (23), which is selected from among fiber, film, and plastic formed articles.

(25) A photo-functional structure comprising, on its surface, photo-functional particles as recited in any one of (1) through (6).

(26) A hydrophilic structure comprising a surface layer containing photo-functional particles as recited in any one of (1) through (6), wherein the surface of the layer exhibits hydrophilicity.

(27) A structure according to (25) or (26), which is at least one member selected from the group consisting of building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses, signboards, piping, wiring, brackets, sanitary materials, and automobile parts.

DETAILED DESCRIPTION OF THE INVENTION

As used herein, the expression "photo-functional property of titanium dioxide particles" refers to optical functions of the particles that are noticeably brought out when the particles are formed into fine particles, including photocatalytic function, ultraviolet ray absorbing ability, and transparency. No particular limitation is imposed on the crystal form of the titanium dioxide employed in the present invention or on the production process thereof, so long as the titanium dioxide has photo-functional properties, such as photocatalytic function, ultraviolet ray absorbing ability, and transparency. For example, the titanium dioxide may assume the form of fine particles obtained from titanium halide through vapor phase reaction or wet reaction. Alternatively, the titanium dioxide may assume the form of fine particles or a sol thereof obtained through wet hydrolysis of a titanic acid solution, or a sintered product of the fine particles or the sol.

As described above, no particular limitation is imposed on the crystal form of the titanium dioxide fine particles employed in the present invention, and the fine particles may assume any crystal form selected from among anatase, rutile, and brookite. The titanium dioxide fine particles may assume a single crystal form selected from the above forms, or may be a mixture of fine particles of these crystal forms.

The titanium dioxide employed in the present invention preferably has an average primary particle size of about 0.001 to about 0.1 μm. When the average particle size is about 0.001 μm or less, efficient production of the titanium dioxide becomes difficult, resulting in failure of use in practice. In contrast, when the average particle size exceeds about 0.1 μm, transparency and photocatalytic function of the titanium dioxide are considerably impaired.

As used herein, the term "condensed phosphate" refers to a salt of an acid obtained through dehydration condensation of ortho-phosphoric acid ($H_3PO_4$). No particular limitation is imposed on the condensed phosphate, but polyphosphates such as pyrophosphate and tripolyphosphate, metaphosphates such as trimetaphosphate and tetrametaphosphate, or ultraphosphates are preferred. The amount of the condensed phosphate present in the titanium dioxide is preferably about 0.01 to about 50 mass %, more preferably about 0.1 to about 20 mass %, on the basis of the mass of the titanium dioxide. When the amount of the condensed phosphate is less than about 0.01 mass %, the photocatalytic effect of the titanium dioxide on a medium such as plastic, paper, or fiber deteriorates the durability of the medium. In contrast, when the amount of the condensed phosphate exceeds about 50 mass %, economical disadvantages arise.

A characteristic feature of the particles of the present invention resides in that an alkaline earth metal (e.g., Be, Mg, Ca, Sr, Ba, or Ra) is present at least between condensed phosphate ions and the titanium dioxide. The alkaline earth metal serves as a binder between the condensed phosphate ions and the titanium dioxide fine particles, and exerts the effect of preventing the liberation of the condensed phosphate ions from the surface of the titanium dioxide. No particular limitation is imposed on the alkaline earth metal employed, but Mg or Ca is preferred. The amount of the alkaline earth metal present in the titanium dioxide is preferably about 0.01 to about 20 mass %, more preferably about 0.01 to about 10 mass %, on the basis of the mass of the titanium dioxide. When the amount of the alkaline earth metal is less than about 0.01 mass %, the metal fails to serve as a binder, and the condensed phosphate is readily liberated in a medium. In contrast, when the amount of the alkaline earth metal exceeds about 20 mass %, dispersibility of the photo-functional titanium dioxide fine particles of the present invention is impaired.

In order to cause an alkaline-earth-metal-containing condensed phosphate to be present on the surface of titanium dioxide, for example, a predetermined condensed phosphate is added to an aqueous slurry containing titanium dioxide and dispersed completely, and then an aqueous solution of an alkaline earth metal chloride or the like is added to the resultant slurry, followed by aging.

In the aforementioned photo-functional powder, a metal such as platinum, rhodium, ruthenium, palladium, silver, copper, or zinc may be supported, in advance, on the surface of the titanium dioxide fine particles. In such a case, the environmental purification activity of the titanium dioxide fine particles is further enhanced, and bactericidal and algicidal activities are also enhanced. The metal may be supported directly on titanium dioxide serving as a raw material, or the metal may be supported when the aforementioned condensed phosphate or alkaline earth metal is incorporated into the titanium dioxide.

As used herein, the term "aqueous slurry" refers to a water dispersion including titanium dioxide particles predominantly containing titanium dioxide fine particles and containing a condensed phosphate on the surface of the fine particles, in which an alkaline earth metal is present at least between condensed phosphate ions and the titanium dioxide particles. The water dispersion may contain a hydrophilic organic solvent.

No particular limitation is imposed on the photo-functional powder content of the aforementioned slurry, but the content is preferably about 0.01 to about 50 mass %, more preferably about 1 to about 40 mass %. When the photo-functional powder content is less than about 0.01 mass %, sufficient photo-functional property cannot be obtained after coating of the slurry. In contrast, when the content exceeds about 50 mass %, problems such as thickening of the slurry arise, along with economical disadvantages.

The pH of the aqueous slurry is about 5 to about 9, preferably about 6 to about 8. When the pH is less than about 5, the slurry may chemically oxidize or erode a substrate, etc.; whereas when the pH exceeds about 9, the slurry may cause chemical change of the substrate, etc., and may adversely affect the environment where the slurry is used, thereby imposing a limitation on the substrate and the environment.

The transmittance of the slurry of the present invention is preferably at least about 20% as measured under the following conditions: amount of the photo-functional particles in the slurry: 10 mass %, thickness of the slurry (optical length): 2 mm, wavelength: 550 nm. The transmittance is more preferably at least about 30%, and higher transmittance is more preferred. When the transmittance of the slurry is less than about 20%, dispersion stability becomes poor, and sufficient photo-functional properties, such as transparency and photocatalytic ability, may fail to be obtained after coating of the slurry.

A binder may be arbitrarily added to the water dispersion (slurry) to thereby prepare a coating agent. The resultant coating agent may be applied to the surfaces of the various structures described below, to thereby produce photo-functional structures.

No particular limitation is imposed on the binder material employed in the present invention, and the binder material may be an organic or inorganic binder. Specific examples of the organic binder include polyvinyl alcohol, melamine resin, urethane resin, celluloid, chitin, starch sheet, polyacrylamide, acrylamide, acrylsilicon, and fluorine resin. Examples of the inorganic binder include zirconium compounds such as zirconium oxychloride, zirconium hydroxychloride, zirconium nitrate, zirconium sulfate, zirconium acetate, ammonium zirconium carbonate, and zirconium propionate; silicon compounds such as silane alkoxide and silicate; alkoxides of metals such as aluminum and Ti; and partially hydrolyzed products thereof.

The amount of the binder contained in the coating agent is preferably about 0.01 to about 20 mass %, more preferably about 1 to about 10 mass %. When the amount of the binder is about 0.01 mass % or less, adhesion of the coating agent becomes insufficient after coating, whereas when the amount of the binder exceeds about 20 mass %, problems such as thickening of the agent arise, along with economical disadvantages.

The photo-functional powder of the present invention may be added to an organic polymer to thereby prepare a composition. Examples of the organic polymer which may be employed include synthetic thermoplastic resin, synthetic thermosetting resin, and natural resin. By virtue of the presence of the aforementioned condensed phosphate and alkaline earth metal, since the organic polymer is not in direct contact with the photocatalytic active surface of titanium dioxide, the organic polymer serving as a medium is barely decomposed and impaired, thereby enhancing durability of the polymer.

Specific examples of the organic polymer include polyolefins such as polyethylene, polypropylene, and polystyrene; polyamides such as nylon 6, nylon 66, and aramid; polyesters such as polyethylene terephthalate and unsaturated polyesters; polyvinyl chloride; polyvinylidene chloride; polyethylene oxide; polyethylene glycol; silicon resin; polyvinyl alcohol; vinylacetal resin; polyacetate; ABS resin; epoxy resin; vinyl acetate resin; cellulose derivatives such as cellulose and rayon; urethane resin; polyurethane resin; polycarbonate resin; urea resin; fluorine resin; polyvinylidene fluoride; phenol resin; celluloid; chitin; starch sheet; acrylic resin; melamine resin; and alkyd resin.

The organic polymer composition containing the photo-functional powder of the present invention can be used in the form of, for example, a coating material (coating composition), a compound (e.g., an organic resin composition containing the powder), or a masterbatch for formed articles containing a large amount of the photo-functional powder. The amount of the photocatalytic powder in the organic polymer composition is about 0.01 to about 80 mass %, preferably about 1 to about 50 mass %, on the basis of the entirety of the composition. The organic polymer composition may contain an absorbent such as activated carbon or zeolite, in order to enhance the effect of removing malodorous substances. In the present invention, the polymer composition is subjected to molding, to thereby obtain a polymer formed article having photo-functional properties. Examples of the formed article obtained from the composition include fiber, film, and plastic formed articles.

Since the organic polymer composition of the present invention exhibits excellent durability, the composition can be used as a coating composition for structures such as wall materials, glass products, signboards, and concrete for roads and buildings. When the surface-treated titanium dioxide photocatalytic powder or the organic polymer composition of the present invention is applied to a structure (organic substance), such as paper, plastic, cloth, or wood, or to the coating of a vehicle, etc., the powder or the composition can sufficiently exhibit its optical functions without causing photocatalytic impairment and destruction of the medium (structure or coating).

The hydrophilic structure of the present invention, containing no silica or silicone molecules, exhibits hydrophilicity, and the contact angle of the structure with respect to water is about 10° or less even in a dark place. In addition, the hydrophilic structure has self-cleaning and antifogging functions.

Best Mode for Carrying Out the Invention

The present invention will next be described in detail by way of Examples, which should not be construed as limiting the invention thereto.

EXAMPLE 1

Pure water (50 liters) (hereinafter the term "liter(s)" will be referred to as simply "L")—which had been weighed in advance—was heated to 98° C. with stirring and maintained at this temperature. A titanium tetrachloride aqueous solution (Ti concentration: 15 mass %) (product of Sumitomo Sitix of Amagasaki, Inc.) (3.6 kg) was added dropwise to the heated water over 60 minutes. The thus-obtained white suspension was subjected to dialysis by use of an electric dialyzer, to thereby adjust the pH of the suspension to 5. A portion of the thus-obtained photocatalytic slurry was collected, and the solid content was measured by means of a dry constant weight method and found to be 2 mass %. The solid (dried powder) was subjected to structure analysis by use of an X-ray diffraction apparatus. As a result, the powder was found to be of brookite-type titanium dioxide containing brookite-type crystals in an amount of 80%.

Subsequently, sodium metaphosphate (for food addition, product of Taihei Chemical Industrial Co., Ltd.) (1 kg) was added to the resultant titanium dioxide slurry, which was stirred sufficiently until the metaphosphate was dispersed in the slurry. Thereafter, calcium chloride (for food addition, product of Tokuyama Corporation) (200 g) was added to pure water (2,000 L) which had been weighed in advance, to thereby prepare a calcium chloride solution. The above-obtained sodium-metaphosphate-containing titanium dioxide slurry and the calcium chloride solution were mixed together, and the resultant mixture was maintained at 40° C. for four hours. The electric conductivity of the mixture was 10,000 µS/cm.

The resultant slurry was washed through filtration by use of a rotary filter press (product of Kotobuki Engineering & Manufacturing Co., Ltd.), and then washed thoroughly with water until the electric conductivity of the filtrate became 50 µS/cm, to thereby obtain a photo-functional slurry. The pH of the resultant photo-functional slurry was measured by use of a pH meter (model: D-22, product of Horiba Ltd.) and found to be 8.5.

A portion of the thus-obtained slurry was collected, and the solid content was measured by means of a dry constant weight method and found to be 10 mass %. A portion of the slurry was subjected to measurement of transmittance at a thickness (optical length) of 2 mm and a wavelength of 550 nm by use of a spectrophotometer CM-3700d (product of Minolta Co., Ltd.), and the transmittance was found to be 37%. Subsequently, a solid (dried powder) obtained through drying a portion of the slurry was subjected to FT-IR analysis by use of FT-IR1650 (product of PerkinElmer), and as a result, the absorption of metaphosphoric acid was observed. Thereafter, the dried powder was subjected to ICP analysis by use of ICPS-100V (product of Shimadzu Corporation), and Ca (5,000 ppm) and phosphorus (12,000 ppm) were found to be present. The primary particle size of the powder was determined to be 0.015 µm on the basis of the results of BET specific surface area as measured by use of Flow Sorb II 2300 (product of Shimadzu Corporation).

Preparation of Coating Agent

Pure water was added to the aforementioned photo-functional slurry to thereby dilute the slurry such that the concentration as reduced to powder became 0.5%. Subsequently, a water-dispersion-type urethane resin (VONDIC1040NS, product of Dainippon Ink and Chemicals, Inc.) was added to the diluted slurry such that the amount of the resin became 70% on the basis of the entirety of the powder, to thereby prepare a coating agent containing the photo-functional powder and the urethane resin.

Subsequently, a polyester nonwoven fabric (6 deniers, product of Takayasu Co., Ltd.) was impregnated with the above-prepared coating agent, and the resultant fabric was squeezed by use of a roller, followed by drying at 80° C. for two hours, to thereby obtain a polyester nonwoven fabric on which the photo-functional powder was supported.

Evaluation of Photocatalytic Activity

The above-obtained polyester nonwoven fabric (10 g) was placed in a 5-liter Tedler bag (product of Gastec Corporation), hydrogen sulfide (60 ppm) was fed into the bag, and the bag was sealed. Subsequently, the sample was irradiated with UV rays of 365 nm by use of Black Light (FL205.BL, 20 W, product of Hitachi Ltd.), at an intensity of 0.25 mW/cm$^2$. Two hours after the irradiation, the concentration of the hydrogen sulfide was measured by use of a detector tube (No. 4LL, product of Gastec Corporation). In this measurement, no hydrogen sulfide was detected.

Weather Resistance Test

The above-obtained polyester nonwoven fabric was irradiated with light of 50 mW/cm$^2$ by use of a light fastness tester (SUNSET CPS+, product of Heraeus). Twenty-four hours after the irradiation, no coloring of the fabric was observed. The results are shown in Table 1.

EXAMPLE 2

The coating agent containing the photo-functional powder and urethane resin obtained in Example 1 was applied to one surface of a polyethylene terephthalate film (Lumilar T, product of Toray Industries, Inc.) (thickness: 100 µm) by use of a 25-µm applicator, and then dried at 80° C. for two hours, to thereby obtain a polyethylene terephthalate film having the photo-functional powder supported thereon.

The thus-obtained polyethylene terephthalate film (surface area: 600 cm$^2$) was subjected to photocatalytic activity evaluation and weather resistance testing in a manner similar to that in Example 1. The photo-functional-powder-bearing polyethylene terephthalate film was subjected to measurement of transmittance by use of a spectrophotometer (UV-2400PC, product of Shimadzu Corporation). As a result, the transmittances at 360 nm and 550 nm were found to be 5% and 98%, respectively. The results are shown in Table 1.

EXAMPLE 3

A portion of the photo-functional slurry obtained in Example 1 was dried by use of a medium fluidized drier (Slurry Drier, product of Okawara Mfg. Co., Ltd.), to thereby prepare a photo-functional powder (5 kg) having a calcium-containing condensed phosphate on the surface of titanium dioxide fine particles.

Preparation of High-Density Polyethylene Masterbatch

The above-prepared photo-functional powder (20 parts by mass), zinc stearate (Zinc Stearate S, product of NOF Corporation) (2 parts by mass), and high-density polyethylene (Jrex F6200FD, product of Japan Polyolefins Co., Ltd.) (78 parts by mass) were melt-kneaded at 170° C. (residence time: about three minutes) by use of a twin-screw extruder (model: PCM30, product of Ikegai Iron Works, Ltd.), and the resultant product was pelletized, to thereby obtain a high-density polyethylene masterbatch (compound) (20 kg) containing a columnar photo-functional powder in an amount of 20%, each powder particle having a diameter of 2 to 3 mmφ, a length of 3 to 5 mm, and a mass of 0.01 to 0.02 g.

Spinning

The above-obtained photo-functional-powder-containing high-density polyethylene masterbatch (compound) (10 kg) and high-density polyethylene (Jrex F6200FD, product of Japan Polyolefins Co., Ltd.) (10 kg) were mixed together for 10 minutes by use of a V-type blender (surface of titanium dioxide fine particles, RKI-40, product of Ikemoto Scientific Technology Co., Ltd.), to thereby prepare a pellet mixture.

Subsequently, the resultant pellet mixture and polyester resin pellets (FM-OK, product of Teijin Ltd.) were fed into a melt extrusion spinning machine (Polymer-Maid 5, product of Chuo Kagaku Kikai Seisakusho), and then spun at a packing temperature of 300° C., to thereby produce 12-denier fiber (35 kg) having a core-sheath structure of photocatalyst-containing high-density polyethylene (sheath)/polyester resin (core), in which the ratio by mass of the photo-functional-powder-containing high-density polyethylene and the polyester resin was 1:1.

The thus-produced fiber (10 g) was subjected to photocatalytic activity evaluation and weather resistance testing in a manner similar to that in Example 1. The results are shown in Table 1.

EXAMPLE 4

The procedure of Example 1 was repeated, except that the calcium chloride (200 g) employed in Example 1 was changed to magnesium chloride (300 g) (for food addition, product of Naikai Salt Industries Co., Ltd.), to thereby prepare a coating agent containing a photo-functional powder and a urethane resin. Subsequently, the thus-prepared coating agent was applied to a polyethylene terephthalate film in a manner similar to that in Example 2, to thereby obtain a polyethylene terephthalate film on which the photo-functional powder was supported. The resultant film was subjected to photocatalytic activity evaluation, weather resistance testing, and measurement of transmittance. The results are shown in Table 1.

EXAMPLE 5

The procedure of Example 1 was repeated, except that the sodium metaphosphate (1 kg) employed in Example 1 was changed to sodium polyphosphate (2.3 kg) (for food addition, product of Taihei Chemical Industrial Co., Ltd.), to thereby prepare a coating agent containing a photo-functional powder and a urethane resin. Subsequently, the thus-prepared coating agent was applied to a polyethylene terephthalate film in a manner similar to that in Example 2, to thereby obtain a polyethylene terephthalate film shown in Table 1 on which the photo-functional powder was supported. The resultant polyethylene terephthalate film was subjected to photocatalytic activity evaluation, weather resistance testing, and measurement of transmittance. The results are shown in Table 1.

EXAMPLE 6

The procedure of Example 5 was repeated, except that the sodium polyphosphate (2.3 kg) employed in Example 5 was changed to sodium ultraphosphate (1.5 kg) (for food addition, product of Taihei Chemical Industrial Co., Ltd.), to thereby obtain a polyethylene terephthalate film on which the photo-functional powder was supported. The resultant polyethylene terephthalate film was subjected to photocatalytic activity evaluation, weather resistance testing, and measurement of transmittance. The results are shown in Table 1.

EXAMPLE 7

Pure water (50 L) which had been weighed in advance was heated to 98° C. with stirring and maintained at this temperature. A titanium tetrachloride aqueous solution (Ti concentration: 15%) (product of Sumitomo Sitix of Amagasaki, Inc.) (3.6 kg) was added dropwise to the heated water over 60 minutes. The thus-obtained white suspension was subjected to dialysis by use of an electric dialyzer, to thereby adjust the pH of the suspension to 5. A portion of the thus-obtained photocatalytic slurry was collected, and the solid content was measured by means of a dry constant weight method and found to be 2 mass %. The solid (dried powder) was subjected to structure analysis by use of an X-ray diffraction apparatus. As a result, the powder was found to be of brookite-type titanium dioxide.

A glass slide (Micro Slide Glass S7213, product of MATSTUNAMI GLASS IND. LTD.) was flow-coated with the titanium dioxide slurry (solid content: 2 mass %), to thereby obtain a structure (comparative sample A). The thickness of the surface layer of comparative sample A as measured by use of a contact-type surface roughness meter was 120 nm. Meanwhile, pure water and nitric acid were added to a mixture of tetramethoxysilane and ethanol, to thereby prepare a partially hydrolyzed silicon-based adhesive (Si content: 4 mass % as reduced to $SiO_2$, pH 2.5); the resultant adhesive was mixed with the titanium dioxide slurry (solid content: 2 mass %) such that the ratio of $SiO_2/TiO_2$ became 0.2; and a glass slide was coated with the resultant mixture, to thereby obtain a structure (comparative sample B). The thickness of the surface layer of comparative sample B was 150 nm.

Subsequently, sodium metaphosphate (for food addition, product of Taihei Chemical Industrial Co., Ltd.) (1 kg) was added to the above-obtained titanium dioxide slurry, and stirred sufficiently until the metaphosphate was dispersed in the slurry.

Thereafter, calcium chloride (for food addition, product of Tokuyama Corporation) (200 g) was added to pure water (2,000 L) which had been weighed in advance, to thereby prepare a calcium chloride solution.

The above-obtained sodium-metaphosphate-containing titanium dioxide slurry and the calcium chloride solution were mixed together, and the resultant mixture was maintained at 40° C. for four hours. The electrical conductivity of the mixture was 10,000 µS/cm.

Subsequently, the resultant slurry was washed through filtration by use of a rotary filter press (product of Kotobuki Engineering & Manufacturing Co., Ltd.), and then washed thoroughly with water until the electrical conductivity of the filtrate became 50 µS/cm, to thereby obtain a photo-functional slurry. The pH of the resultant photo-functional slurry was measured by use of a pH meter (model: D-22, product of HORIBA) and found to be 8.5.

A portion of the thus-obtained slurry was collected, and the solid content was measured by means of a dry constant weight method. As a result, the solid content was found to be 10 mass %. Subsequently, a solid (dried powder) obtained through drying a portion of the slurry was subjected to FT-IR analysis by use of FT-IR1650 (product of PerkinElmer), to thereby observe the absorption of metaphosphoric acid. Thereafter, the dried powder was subjected to ICP analysis by use of ICPS-100V (product of Shimadzu Corporation), and Ca (5,000 ppm) and phosphorus (12,000 ppm) were found to be present. The primary particle size of the powder was determined to be 0.015 µm on the basis of the results of BET specific surface area as measured by use of Flow Sorb II 2300 (product of Shimadzu Corporation). Pure water was added to the above-obtained slurry such the solid content became 2 mass %, and a glass slide was flow-coated with the resultant mixture in a manner similar to that described above, to thereby obtain a structure (Example sample). The thickness of the surface layer of the Example sample as measured in a manner similar to that described above was 130 nm.

The hydrophilicity of each of Example sample and comparative samples A and B was evaluated on the basis of the contact angle between the surface layer and a water droplet on the surface layer. In order to evaluate the hydrophilicity, each sample was maintained in a dark place, and time-course change in the contact angle was measured. The contact angle was measured by use of a contact angle meter (CA-D, product of Kyowa Interface Science Co., Ltd.).

Figure 1:
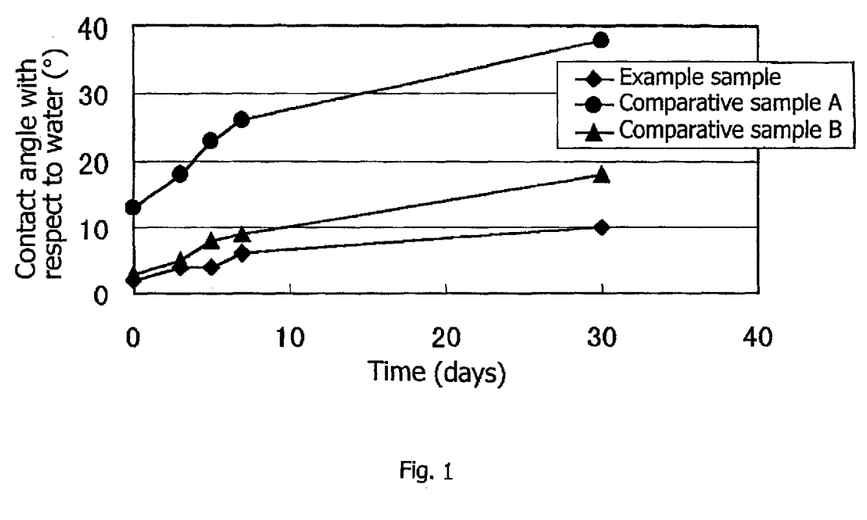
FIG. 1 is a graph showing time-course change in contact angle of water with respect to the structure of the present invention and a conventional structure.

As a result, as shown in FIG. 1, the structure of the present invention (Example sample) was found to exhibit excellent hydrophilicity even in a dark place; i.e., the contact angle was 10° or less.

Comparative Example 1

A coating agent containing a urethane resin and the brookite-type titanium dioxide employed in Example 1 was produced in a manner similar to that in Example 1. The resultant coating agent was applied to a polyethylene terephthalate film in a manner similar to that in Example 2, to thereby obtain a polyethylene terephthalate film having titanium dioxide supported thereon. The resultant film was subjected to photocatalytic activity evaluation, weather resistance testing, and measurement of transmittance. The results are shown in Table 1.

Comparative Example 2

To pure water (200 L) were added commercially available anatase for pigment (A100, product of Ishihara Sangyo Kaisha, Ltd.) (particle size: 0.18 μm) (10 kg) and sodium metaphosphate (for food addition, product of Taihei Chemical Industrial Co., Ltd.) (1 kg), and the resultant mixture was stirred sufficiently until the anatase and the metaphosphate were dispersed. Subsequently, calcium chloride (for food addition, product of Tokuyama Corporation) (200 g) was added to pure water (2,000 L) which had been weighed in advance, and stirred by use of a laboratory stirrer, to thereby prepare a calcium chloride solution. The above-obtained sodium-metaphosphate-containing titanium dioxide slurry and the calcium chloride solution were mixed together, and the resultant mixture was maintained at 40° C. for four hours. The electrical conductivity of the mixture was 10,000 μS/cm. The transmittance of the slurry was measured at 550 nm in a manner similar to that in Example 1, and found to be 12%. The resultant slurry was washed through filtration by use of a rotary filter press (product of Kotobuki Engineering & Manufacturing Co., Ltd.), and then washed thoroughly with water until the electrical conductivity of the filtrate became 50 μS/cm.

A portion of the thus-obtained slurry was collected, and the solid content was measured by means of a dry constant weight method. As a result, the solid content was found to be 10 mass %. Subsequently, the resultant powder was subjected to FT-IR analysis by use of FT-IR1650 (product of PerkinElmer), to thereby observe the absorption of metaphosphoric acid. Thereafter, the dried powder was subjected to ICP analysis by use of ICPS-100V (product of Shimadzu Corporation), and Ca (2,000 ppm) and phosphorus (8,000 ppm) were found to be present.

Subsequently, a coating agent containing a urethane resin and the above-obtained slurry was produced in a manner similar to that in Example 1. The resultant coating agent was applied to a polyethylene terephthalate film in a manner similar to that in Example 2, to thereby obtain a polyethylene terephthalate film having a photo-functional powder supported thereon. The resultant film was subjected to photocatalytic activity evaluation, weather resistance testing, and measurement of transmittance. The results are shown in Table 1.

Comparative Example 3

The water-soluble urethane resin employed in Example 1 was dissolved in pure water such that the concentration of the resin became 0.35%. The thus-obtained coating agent was applied to the polyethylene terephthalate film employed in Example 2, to thereby obtain a film. The resultant film was subjected to photocatalytic activity evaluation, weather resistance testing, and measurement of transmittance. The results are shown in Table 1.

TABLE 1

| | Particle size of titanium dioxide (μm) | Condensed phosphoric acid | Alkaline earth metal | Use form | Residual ratio of hydrogen sulfide | Weather resistance test | Transmittance at 360 nm | Transmittance at 550 nm |
|---|---|---|---|---|---|---|---|---|
| Ex. 1 | 0.015 | Metaphosphoric acid | Ca | Coating of nonwoven fabric | 0% | No coloring | — | — |
| Ex. 2 | 0.015 | Metaphosphoric acid | Ca | Coating of film | 25% | No coloring | 5% | 98% |
| Ex. 3 | 0.015 | Metaphosphoric acid | Ca | Kneading into fiber | 0% | No coloring | — | — |
| Ex. 4 | 0.015 | Metaphosphoric acid | Mg | Coating of film | 30% | No coloring | 4% | 97% |
| Ex. 5 | 0.015 | Polyphosphoric acid | Ca | Coating of film | 32% | No coloring | 6% | 96% |
| Ex. 6 | 0.015 | Ultraphosphoric acid | Ca | Coating of film | 28% | No coloring | 5% | 95% |
| Comp. Ex. 1 | 0.015 | — | — | Coating of film | 20% | Coloring | 3% | 98% |
| Comp. Ex. 2 | 0.2 | Metaphosphoric acid | Ca | Coating of film | 98% | No coloring | 2% | 3% |
| Comp. Ex. 3 | — | — | — | Coating of film | 100% | No coloring | 96% | 99% |

What is claimed is:

1. Photo-functional particles characterized by comprising titanium dioxide and a condensed phosphate containing an alkaline earth metal which is present on the surface of the titanium dioxide.

2. Photo-functional particles according to claim 1, wherein the titanium dioxide has a particle size falling within a range of about 0.001 to about 0.1 μm.

3. Photo-functional particles according to claim 1, wherein the titanium dioxide contains at least one crystal form selected from the group consisting of anatase, rutile, and brookite.

4. Photo-functional particles according to claim 1, wherein the condensed phosphate is at least one species selected from the group consisting of a polyphosphate, a metaphosphate, and an ultraphosphate.

5. Photo-functional particles according to claim 1, wherein the condensed phosphate is a pyrophosphate.

6. Photo-functional particles according to claim 1, wherein the alkaline earth metal is at least one species selected from among Mg and Ca.

7. A photo-functional powder comprising photo-functional particles, the particles comprising titanium dioxide and a condensed phosphate containing an alkaline earth metal which is present on the surface of the titanium dioxide.

8. A photo-functional powder according to claim 7, wherein the titanium dioxide has a primary particle size falling within a range of about 0.001 to about 0.1 μm.

9. A photo-functional powder according to claim 7, wherein the titanium dioxide contains at least one crystal form selected from the group consisting of anatase, rutile, and brookite.

10. A photo-functional powder according to claim 7, wherein the condensed phosphate is at least one species selected from among a polyphosphate, a metaphosphate, and an ultraphosphate.

11. A photo-functional powder according to claim 7, wherein the condensed phosphate is a pyrophosphate.

12. A photo-functional powder according to claim 7, wherein the alkaline earth metal is at least one species selected from among Mg and Ca.

13. An aqueous slurry comprising photo-functional particles as recited in any one of claims 1 through 6.

14. An aqueous slurry according to claim 13, which has a pH of about 5 to about 9.

15. An aqueous slurry according to claim 13, wherein, when the slurry contains the photo-functional particles in an amount of 10 mass %, the slurry has a transmittance of at least about 20% at a wavelength of 550 nm and an optical length of 2 mm.

16. A coating agent comprising an aqueous slurry as recited in claim 13.

17. An organic polymer composition comprising a photo-functional powder as recited in claim 7.

18. An organic polymer composition according to claim 17, which contains the photo-functional powder in an amount of about 0.01 to about 80 mass % on the basis of the entire mass of the composition.

19. An organic polymer composition according to claim 17, wherein the organic polymer of the composition is at least one species selected from the group consisting of a synthetic thermoplastic resin, a synthetic thermosetting resin, and a natural resin.

20. A coating material comprising an organic polymer composition as recited in any one of claims 17 through 19.

21. A compound comprising an organic polymer composition as recited in any one of claims 17 through 19.

22. A masterbatch for a formed article selected from among fiber, film, and plastic formed articles, comprising an organic polymer composition as recited in any one of claims 17 through 19 containing the photo-functional powder.

23. A photo-functional formed article which is formed from an organic polymer composition as recited in any one of claims 17 through 19 containing the photo-functional powder.

24. A photo-functional formed article according to claim 23, which is selected from among fiber, film, and plastic formed articles.

25. A photo-functional structure comprising, on its surface, photo-functional particles as recited in any one of claims 1 through 6.

26. A hydrophilic structure comprising a surface layer containing photo-functional particles as recited in any one of claims 1 through 6, wherein the surface of the layer exhibits hydrophilicity.

27. A structure according to claim 25, which is at least one member selected from the group consisting of building materials, machinery, vehicles, glass products, electric appliances, agriculture materials, electronic apparatus, tools, tableware, bath products, toiletry products, furniture, clothing, cloth products, fibers, leather products, and paper products, sporting goods, futon, containers, eyeglasses, signboards, piping, wiring, brackets, sanitary material, and automobile parts.

* * * * *